Feb. 20, 1951  E. C. WENTZ ET AL  2,542,851
WELDING TRANSFORMER

Filed May 10, 1946  3 Sheets-Sheet 1

WITNESSES:
E.G. McBlakey
Nw. C. Goowe

INVENTORS
Edward C. Wentz and
Fred L.W. Norton.
BY Franklin E. Hardy
ATTORNEY

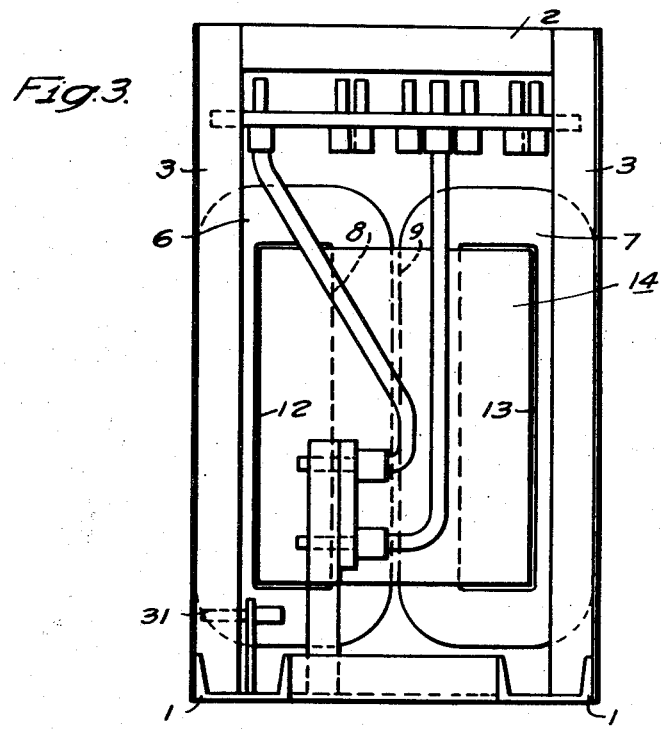
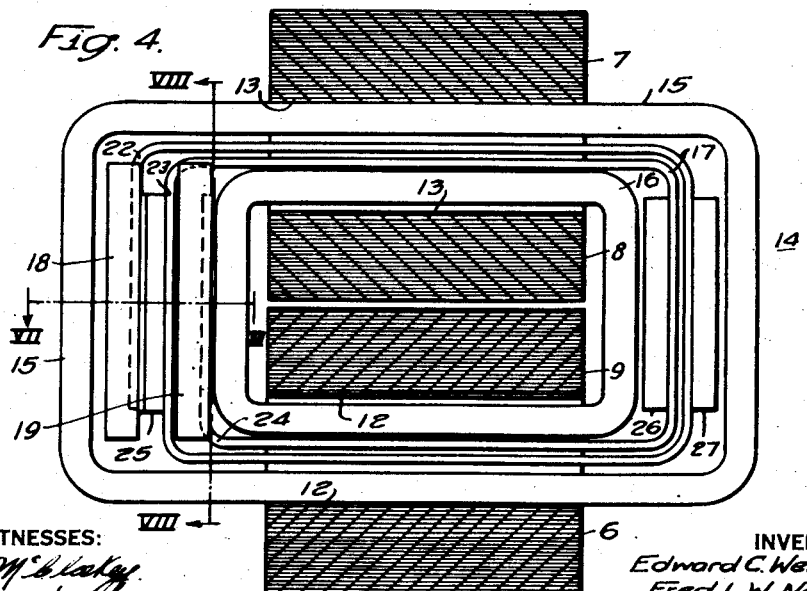

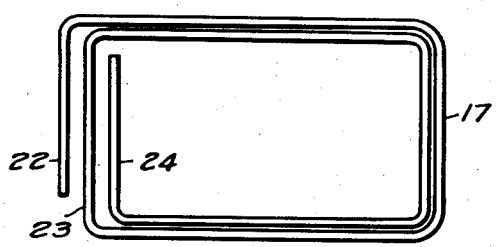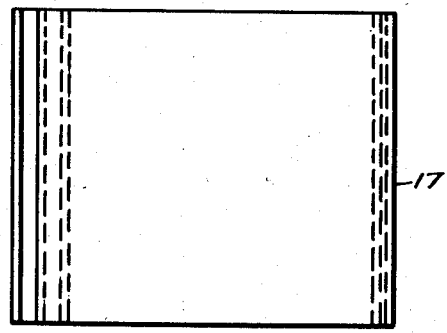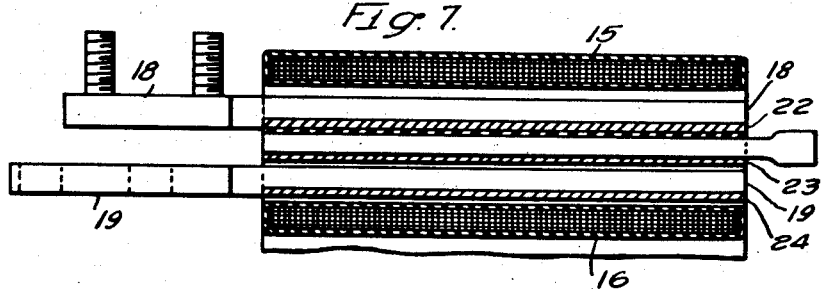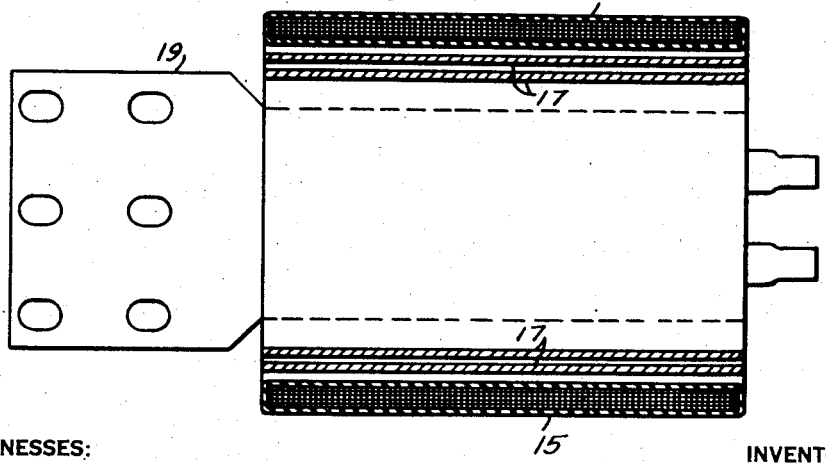

Patented Feb. 20, 1951

2,542,851

UNITED STATES PATENT OFFICE 2,542,851

WELDING TRANSFORMER

Edward C. Wentz, Sharpsville, and Fred L. W. Norton, Sharon, Pa., assignors to Westinghouse Electric Corporation, East Pittsburgh, Pa., a corporation of Pennsylvania Application May 10, 1946, Serial No. 668,680

1 Claim. (Cl. 175—356)

Our invention relates to electrical transformers and particularly to water-cooled dry type transformers employed for resistance welding. In spot welding and seam welding, the welding is done with a current of many thousand amperes supplied at a low voltage, usually less than 15 volts. The flow of this high current through the material to be welded heats it to a welding temperature. Transformers employed to supply this current are commonly made with a single turn secondary winding which may be formed of cast copper. The copper casting is usually water-cooled by some suitable means such as forming the conductor as a hollow member permitting the flow of water through passageways that are cast into the secondary coil structure.

This conventional construction has some important disadvantages. The copper casting is expensive and its formation requires intricate pattern and foundry work. Cast copper has about 50% the conductivity of sheet copper, thus requiring about twice the cross-section of conductor when cast copper is used in place of sheet copper. Because of the difficulties of manufacture, it is not practical to form a cast copper coil having more than a single turn.

To eliminate all these disadvantages, we have developed a new type of coil having the following essential features. The primary and secondary coils are concentric. The secondary coil is made of sheet copper having a plurality of turns wound in the form of a spiral, the one about the other which may be formed about a rectangular center block, thus resulting in a substantially rectangular coil. Water-cooled chambers are provided along the end portions of the turns of the secondary coil so that the space required for these chambers is outside of the window of the core structure, so that it is not necessary to enlarge the size of the core windows to accommodate the cooling chambers. Water-jackets may be brazed to the end portions of each turn of the secondary coil to form the water-cooling chambers, the brazing being effected by a furnace brazing process which eliminates the time and expense required for hand-brazing and eliminates as well most of the warping and misalignment which frequently results from hand-brazing.

In certain of the newer types of welders, a higher secondary voltage is required than was formerly employed so that the limitations to the conventional prior art structure pointed out above becomes more important than formerly.

It is an object of the invention to provide a transformer in which the above-named disadvantages are overcome and in which the resulting transformer makes most efficient use of the copper employed as the conducting circuit material, the transformer losses are low, and the resulting transformer is small in size and light in weight.

It is a further object of the invention to provide a welding transformer having concentric primary and secondary coils, the secondary coil having a plurality of turns wound in a concentric spiral.

It is a still further object of the invention to form the secondary windings so that the winding turns are rectangular or oblong in shape and to provide water-cooling chambers along the end sections of the secondary winding coil so that it is not necessary to increase the size of the core window opening to accommodate the secondary winding because of the employment of the water-cooling chambers.

In accordance with the invention, the secondary coil is made of sheet copper having several concentric turns, the one about the other with cooling chambers provided in the end sections outside the core window.

Other objects and advantages of the invention will be apparent from the following description of a particular embodiment thereof, reference being had to the accompanying drawings, in which:

Fig. 3 is an end view of the core and coil assembly shown in Fig. 1;

Fig. 4 is a horizontal sectional view taken along the line IV—IV of Fig. 2, showing the core and coil layout;

Figs. 5 and 6 are plan and elevational views, respectively, of the low voltage coil; and Figs. 7 and 8 are sectional views of a part of the apparatus taken along the lines VII—VII and VIII—VIII, respectively, of Fig. 4 to illustrate the manner of connecting the low voltage terminals to the low voltage winding coils.

Figure 1:
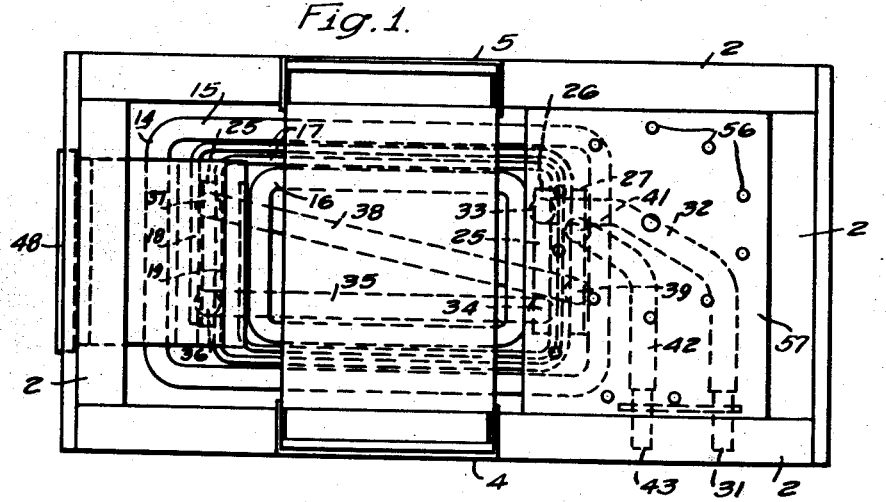
Figure 1 is a top plan view of the core and coil assembly of a transformer constructed in accordance with our invention.
Figure 2:
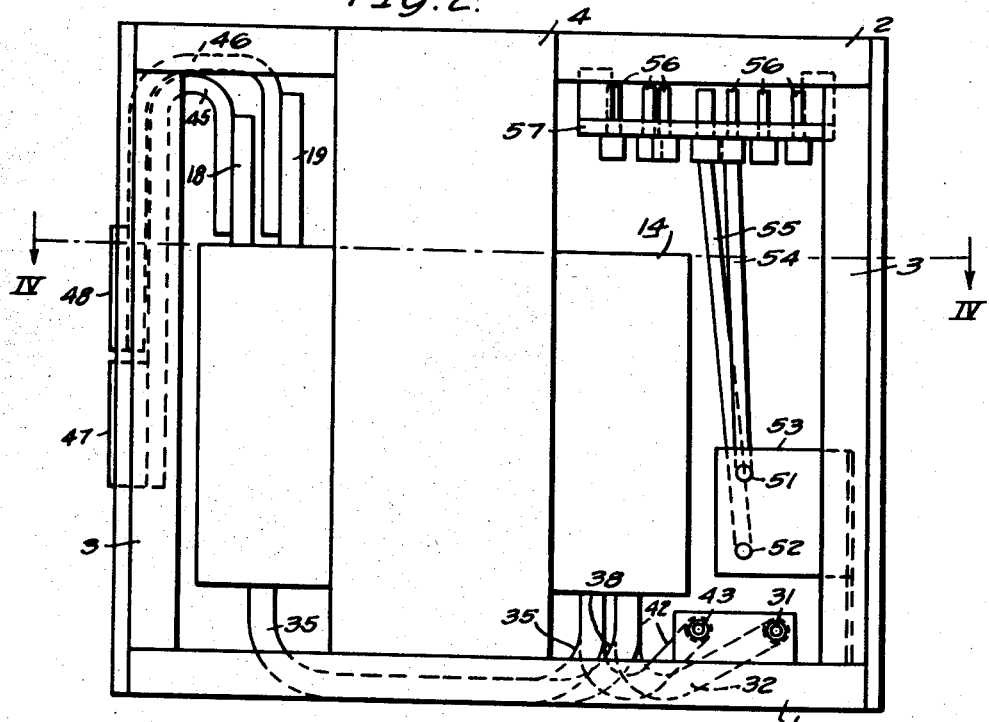
Fig. 2 is a side elevational view of the core and coil assembly shown in Fig. 1.

Referring to the drawings and particularly to Figures 1, 2 and 3, a frame is provided constructed of iron members in the form of channels, angle irons or plates such as the members 1 at the bottom of the frame structure, the members 2 at the top of the frame structure, and the vertical members 3 at the corners, which together outline the space occupied by the core and coil assembly. Channel members 4 and 5 extend vertically on opposite sides of the space outlined by the frame structure to accommodate the outer parts of two core loop structures 6 and 7 comprising the magnetic circuits of the transformer core and best shown in Figs. 3 and 4. The inner legs 8 and 9, respectively, of the two core loops 6 and 7 together comprise a winding leg for the several transformer coils.

As best shown in Figs. 3 and 4, the core loop 6 surrounds an opening or window 12 and the core loop 7 surrounds a similar opening or window 13. The primary and secondary transformer winding coils are so positioned as to pass through these two windows 12 and 13. The winding coil assembly 14 includes an outer primary winding coil 15 and an inner primary winding coil 16 as best shown in Figs. 1 and 4, which two primary winding coils are spaced apart to accommodate a secondary coil 17 positioned between the two primary winding coils.

The secondary coil 17 is shown as having two turns extending between the coil terminals 18 and 19 and comprising a sheet of copper or similar conducting material having a width extending from the top to the bottom of the coil assembly, thus corresponding in height substantially to the vertical dimension of the windows 12 and 13 in the core loops 6 and 7. Figs. 5 and 6 are detail views of the secondary coil winding without the water-jackets attached.

As will be clearly seen with reference to Figs. 4, 5 and 7, the outer end 22 of the secondary winding coil 17 is attached to the secondary coil terminal 18 as by brazing and passes once around the winding leg portions 8 and 9 of the core structure to the area 23 and then a second time around the winding leg portion of the core structure to the end 22 of the secondary coil which is attached as by brazing to the secondary coil terminal 19. It will be appreciated that the primary winding coils 15 and 16 are provided with a relatively large number of winding turns carrying a relatively low current at a relatively high terminal voltage, whereas the secondary winding coil 17 is provided with a relatively few turns (shown as two turns) and carries a relatively high secondary current at a low output voltage. Because of the high current carried by the secondary winding coil and the heat resulting therefrom, it is desirable to provide means for cooling the coil to prevent the coil conductor from developing excessive temperatures. As best shown in Figs. 1 and 4, water-jackets 25, 26 and 27 are provided and are brazed to the surface of the rectangular secondary coil 17 adjacent its ends, the jacket 25 being attached to the intermediate portion 23 at the end of the winding adjacent the secondary terminals 18 and 19 while the water-jackets 26 and 27 are attached to the opposite end of the coil structure and are attached to the two turns thereof respectively.

As best shown in Figs. 1 and 2, a system of insulating conduits or hose is provided for circulating cooling water through the water-jackets 25, 26 and 27. One terminal of the conduit or pipe system is shown at 31 from which a pipe 32 connects with an opening 33 in the bottom of the water-jacket 26. After the water has passed through the passageway provided in this water-jacket, it leaves the water-jacket 26 by opening 34 that is also in the bottom of the water-jacket 26, and passes through the pipe 35 to the opening 36 in the lower part of the jacket 25, then through the passageways in this jacket and from the opening 37 to pipe 38 and into the water-jacket 27 through opening 39, again leaving this water-jacket through the opening 41 to the pipe 42 and to the terminal 43 of the water-conducting passageway. By connecting the above-described pipe system to a supply of cold water and circulating the cooling water through the system, the flat areas of the rectangular secondary coil 17 adjacent the water-jackets 25, 26 and 27 are maintained in contact with cooling water from which surfaces a considerable amount of heat is conducted away through the cooling water system.

As shown in Fig. 2, the secondary coil terminal members 18 and 19 are connected by conducting cables 45 and 46, respectively, to the relatively large transformer secondary terminals 47 and 48 which carries the large output current from the secondary winding 17 to the load connected to the transformer.

The primary transformer terminals 51 and 52 are shown mounted on a terminal board 53 and are connected by conductor cables 54 and 55 to selected contact members 56 mounted on an upper terminal board 57. The primary winding circuit is completed from these contact members 56 through the two primary windings 15 and 16 in a conventional manner. The detail circuits are not illustrated in the drawings since to do so would unnecessarily complicate the drawings without illustrating anything pertinent to applicants' invention.

It will be obvious to those skilled in the art that modifications in the structure illustrated and described may be made within the spirit of our invention and we do not wish to be limited otherwise than by the scope of the appended claims.

We claim as our invention:

In an electrical transformer, in combination, a magnetic core structure having two vertically positioned rectangular core windows and a winding leg positioned between them, a pair of concentric rectangular primary coils spaced apart and extending substantially from the top to the bottom of the windows and having straight side portions extending through the windows and connected by straight end portions, and a two turn secondary coil extending substantially from the top to the bottom of the windows and positioned between the pair of primary coils and formed of two concentric turns extending the one about the other of a sheet of conducting material and having straight side portions extending closely together through the windows in the core and straight end portions connecting the side portions in spaced relation, water-jackets made integral with the end portions only of the secondary coil outside the core windows forming water-chambers extending substantially over the entire area of one side of the end portions of the secondary coil, and means for circulating cooling water through said water-chambers for cooling the secondary coil.

EDWARD C. WENTZ.
FRED L. W. NORTON.

REFERENCES CITED

The following references are of record in the file of this patent:

UNITED STATES PATENTS

| Number | Name | Date |
|---|---|---|
| 753,461 | Anderson | Mar. 1, 1904 |
| 1,449,206 | Weed | Mar. 20, 1923 |
| 1,789,229 | Gebhard | Jan. 13, 1931 |
| 2,063,257 | Martin | Dec. 8, 1936 |
| 2,355,560 | Roberds | Aug. 6, 1944 |
| 2,366,290 | Rudd | Jan. 2, 1945 |
| 2,374,018 | Johnson | Apr. 17, 1945 |
| 2,378,884 | Seifert | June 19, 1945 |